United States Patent
Huhn et al.

[11] 3,886,279
[45] May 27, 1975

[54] ANTI-INFLAMMATORY ANALGESIC METHOD OF TREATMENT AND COMPOSITION

[75] Inventors: Magda Huhn; László Tardos; Éva Somfai; Gábor Resofszki; Vera Kovács née Mindler; Mária Pálffy née Oswald, all of Budapest, Hungary

[73] Assignee: Chinoin Gyogyszer- es Vegyeszeti Termekek Gyara Rt., Budapest, Hungary

[22] Filed: Aug. 13, 1973

[21] Appl. No.: 387,964

[30]   Foreign Application Priority Data
Aug. 24, 1972   Hungary................... CI 1268

[52] U.S. Cl. ............ 424/274; 424/263; 424/270; 424/272
[51] Int. Cl.............................................. A61k 27/00
[58] Field of Search ..................... 424/274

[56]           References Cited
              UNITED STATES PATENTS
3,488,731   1/1970   Sletzenger................ 26/326.13

*Primary Examiner*—Stanley J. Friedman
*Attorney, Agent, or Firm*—Karl F. Ross; Herbert Dubno

[57]           ABSTRACT

An anti-inflammatory analgesic pharmaceutical composition comprising as active ingredient a compound of the formula

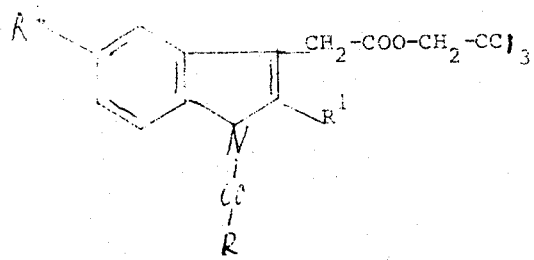

wherein
R is a phenyl, chlorophenyl, napthyl, pyrrole, furane, furazole, thiazole, thiadiazole or pyridine group;
$R^1$ is hydrogen or alkyl having 1 to 7 carbon atoms;
$R^2$ is hydrogen, alkyl having 1 to 7 carbon atoms, alkoxy having 1 to 7 carbon atoms or dialkylamino having 1 to 7 carbon atoms per alkyl group in admixture with a pharmaceutical carrier.

. 1 Claim, No Drawings

ANTI-INFLAMMATORY ANALGESIC METHOD OF TREATMENT AND COMPOSITION

This invention relates to pharmaceutical compositions having anti-inflammatory and analgesic properties. More particularly the present invention is directed to pharmaceutical compositions containing N-acylated-indole-3-carboxylic acid esters and a process for the preparation of such compositions.

The active ingredients of the invention compound correspond to the formula (I)

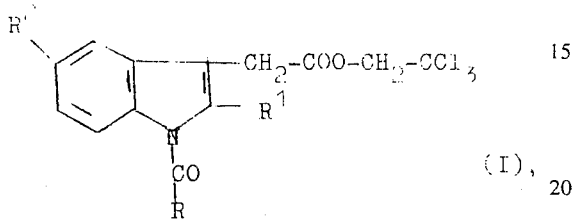

wherein:
R is an optionally substituted aryl group or an optionally substituted heterocyclic group containing one or more oxygen, sulphur or nitrogen atoms;
$R^1$ is hydrogen or alkyl;
$R^2$ is hydrogen, alkyl, alkoxy or dialkylamino.

The pharmaceutical compositions of the present invention contain as active ingredient a compound of the formula (I) in admixture with inert solid or liquid pharmaceutical carriers and optionally further additives.

In the formula (I) R stands preferably for a phenyl, naphthyl, pyrrole, furane, furazol, thiazole, thiadiazole, pyridine ring which may be optionally substituted by halogen and/or nitro groups.

The term "alkyl group" used in the specification means straight or branched chain groups having 1–7, preferably 1–4 carbon atoms (e.g. methyl, ethyl, n-propyl, isobutyl etc.). The "alkoxy groups" may also be straight or branched chain and contain 1–7, preferably 1–4 carbon atoms (e.g. methoxy, ethoxy, n-propoxy, n-butoxy, etc.).

A particularly preferred compound of the formula (I) is the trichloroethyl-1-(p-chloro-benzoyl)-2-methyl-5-methoxy-3-indolyl-acetate, R being p-chlorophenyl.

The compounds of the formula (I) possess useful anti-inflammatory and analgesic properties. The pharmacological activity of the above preferable representative of the compounds of the formula (I) is demonstrated in the Examples. The compounds of the formula (I) possess the great advantage of having a very low toxicity.

The pharmaceutical compositions of the present invention may be prepared by methods of pharmaceutical industry known per se by admixing the active ingredient with suitable inert solid or liquid carriers and formulating the same in forms suitable for direct medical use. The pharmaceutical compositions may be finished in forms suitable for oral, rectal or parenteral administration. The compositions may be solid (e.g. tablets, pills, coated pills, capsules suppositories) semi-solid (e.g. ointments) or liquid forms (e.g. solutions, emulsions, or suspensions).

The compositions may contain the usual carriers, such as talc, starch, gelatine, water, polyalkylene glycol, magnesium stearate, calcium carbonate etc. The compositions may also contain usual additives, such as emulsifying, wetting, stabilizing, suspending agents, salts for adjusting the osmotic pressure, buffers etc. Further pharmaceutically active substances may also be present in the compositions. Preferred dosage units are the tablets and capsules. These may be prepared by admixing throughly the sieved and ground components and filling the homogeneous mixture into capsules. Another preferred dosage form is the suppository intended for rectal administration. These may be prepared by melting the base-material of the suppository (e.g. Witepsol W) and homogenously distributing the lump-free powdered active ingredient in the melt and thereupon cooling the mass and filling the same into suppository forms.

The compounds of the formula (I) may be prepared by reacting a compound of the formula (II)

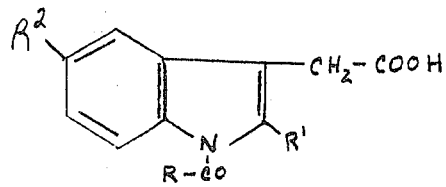

with trichloroethanol or reacting a salt of a compound of the formula (II) formed with an organic base with chloroformic acid trichloroethyl ester and subjecting the mixed anhydride thus obtained to decarboxylation.

The direct esterification may be carried out in the presence of dicyclohexylcarbodiimide or an acid (e.g. p-toluenesulphonic acid). As solvent methylene chloride or an other halogenated hydrocarbon may be used.

The reaction between an organic salt of a compound of the formula (II) formed with an organic base and chloroformic acid trichloroethylester is carried out in the presence of an inert solvent (e.g. methylene chloride). The mixed anhydrides thus obtained are then subjected to decarboxylation, generally by heating.

The dosage of the compounds of the formula (I) may vary between wide ranges and depends of the circumstances of the given particular case (e.g. condition of the patient, etc.). The daily dosage of trichloroethyl-1-(p-chloro-benzoyl)-2-methyl-5-methoxy-3-indolyl-acetate may be from about 90 mg. to about 150 mg. in oral administration. The active ingredient content of the compositions may also between wide ranges. The preferred dosage units (tablets, capsules) may have an active ingredient content of from about 25 mg. to about 50 mg., particularly about 30 mg.

Further details of our invention are to be found in the Examples without limiting the scope of the claims to the Examples.

EXAMPLE 1

Capsules having the following composition are prepared by methods of pharmaceutical industry known per se by admixing the components in the given ratio and filling the thoroughly blended mixture into capsules:

| | |
|---|---|
| Trichloroethyl-1-(p-chloro-benzoyl)-2-methyl-5-methoxy-3-indolyl-acetate | 50 mg. |
| Colloidal silicic acid | 5 mg. |
| Talc | 5 mg. |
| Magnesium-stearate | 10 mg. |

Potato starch 20 mg.
Lactose 20 mg.

EXAMPLE 2

Suppositories having the following composition are prepared:

| | |
|---|---|
| Trichloroethyl-1-(p-chloro-benzoyl)-2-methyl-5-methoxy-3-indolyl-acetate | 0.05 g. |
| Witepsol W | 2.08 g. |
| Total weight | 2.13 g. |

The Witepsol W suppository base material is melt and filtered into a mass-forming kettle through a cottonfilter. The sieved active ingredient is carefully rubbed with a small portion of the melt cooled to 40°–45°C, whereupon it is added to the content of the mass-forming kettle and stirred until the mass becomes cold. The suppositories are molded at a temperature of 34°–35°C. The suppositories are frozen at a temperature of −5° to −8°C.

EXAMPLE 3

According to the process described in Example 2 suppositories having the following composition are prepared:

| | |
|---|---|
| Trichloroethyl-1-(p-chloro-benzoyl)-2-methyl-5-methoxy-3-indolyl-acetate | 0.10 g. |
| Witepsol W | 2.03 g. |
| Total weight | 2.13 g. |

EXAMPLE 4

36 g. of 1-(p-chlorobenzoyl)-2-methyl-5-methoxy-indol-3-yl-acetic acid are suspended in 400 ml. of methylene chloride, 8 ml. of pyridine and 14 ml. of trichloroethanol are added to the mixture. 21 g. of dicyclohexylcarbodiimide are dissolved in 100 ml. of methylene chloride and added to the mixture. The mixture is refluxed for 2 hours, whereafter the precipitated dicyclohexylurea is filtered off. The dichloromethane solution extracted with a 2 n hydrochloric acid solution and with a saturated sodium hydrogen carbonate solution and finally with a sodium chloride solution. After drying on magnesium sulphate the solvent is removed.

The remaining 1-(p-chlorobenzoyl)-2-methyl-5-methoxy-indol-3-yl-acetic acid is recrystallized from 300 ml. of methanol. Mp.: 95°–97°C.

Analysis: Mol weight 489,19 ($C_{21}H_{17}O_4N Cl_4$)
Calculated: C% 51,58  H% 3.51  N% 2.86  Cl% 29.98
Found:      C% 52.01  H% 3.83  N% 2.80  Cl% 29.5

IR spectra
  1.750 (ester —C=O)
  1.670 (amide —C=O)
  1.140 (ester C—O—C)
$R_f$: 0.85 (benzene-ethylacetate 2:1)

EXAMPLE 5

15 g. (10 ml. 0.075 moles) of chloroformic acid trichloroethylester are dissolved in 100 ml. of methylenechloride and at −10°C a solution prepared from 18 g. (0.05 moles) of 1-(p-chlorobenzoyl)-2-methyl-5-methoxy-indol-3-yl-acetic acid and 4 ml. of pyridine in 100 ml. of methylene chloride is added. The reaction mixture is stirred for 15 minutes at −10 °C, then a solution of 4 ml. of pyridine in 10 ml. of methylene chloride is dropwise added. The temperature is rised to 20°–25°C and the mixture is stirred for a further hour. The solution is extracted with a 2 n sulphuric acid solution, with a saturated sodium hydrogen carbonate solution and finally with a saturated sodiumchloride solution. The extracted solution is dried on magnesium sulphate and the solvent is removed. The remainder is recrystallized from 180 ml. of methanol. The product obtained is the 1-(p-chlorobenzoyl)-2-methyl-5-methoxy-indol-3-yl-acetic-acid trichloroethyl ester. Mp.: 95°–97°C. The results of the tests carried out with 1-(p-chlorobenzoyl)-2-methyl-5-methoxy-indol-3-yl-actic acid trichloroethylester are summarized as follows:

I. Examination of Antiinflammatory Effect

1. Kaolin Oedema Test

The experiments were performed on female rats weighing 110–130 g. divided into groups of 10 animals. The rats were starved for 24 hours prior to the experiment. The test substance was administered orally, the controls obtained the suspending solution without the active ingredient. 1 hour following drug administration the animals were injected s.c. 0.1 ml. of a suspension of 5% kaolin into the foot pad. During the following period the inflammatory reaction is manifested by a swelling of the foot. The diameter of the foot of the treated and control animals was measured 2, 3.5 and 5 hours after s.c. injection of kaolin. The efficiency of the test compound was calculated from the difference of the diameter of the foot in the treated and control animals. Significance was calculated with Student's "t" test and the effect of the drug was expressed also as per cent. The results of the experiments are presented in Table 1.

Table 1

| | Inhibition of kaolin oedema | | | | | | | |
|---|---|---|---|---|---|---|---|---|
| Dose mg./kg. | Effect 2$^h$ oedema | | Inhibition % | Effect 3.5$^h$ oedema | | Inhibition % | Effect 5$^h$ oedema | | Inhibition % |
| | control | treated | | control | treated | | control | treated | |
| 13.7 | 2.55±0.25 | 2.28±0.50 | 10.6 | 2.90±0.36 | 2.35±0.54 | 19.0 | 3.29±0.34 | 2.56±0.53 | 22.2 |
| | 2.57±0.17 | 2.39±0.36 | 9.8 | 2.97±0.34 | 2.54±0.53 | 15.1 | 3.26±0.31 | 2.77±0.58 | 15.1 |
| 34 | 2.55±0.25 | 2.27±0.30 | 11.0 | 2.90±0.36 | 2.26±0.30 | 22.1 | 3.29±0.34 | 2.48±0.36 | 24.7 |
| | 2.87±0.55 | 2.46±0.49 | 13.6 | 3.13±0.70 | 2.47±0.41 | 22.1 | 3.72±0.62 | 2.72±0.62 | 29.9 |
| 51 | 2.31±0.49 | 1.86±0.32 | 19.5 | 2.72±0.43 | 2.05±0.30 | 24.6 | 3.03±0.54 | 2.23±0.28 | 26.4 |

2. Cotton Pellet Granuloma

The experiments were performed on male rats weighing 140–160 g. In ether anaesthesia a 25 ±1 g. cotton pellet was placed in each of two subcutaneous pockets in the dorsal region of the animal. The drug was administered orally during a period of 7 days. The control obtained a drugfree suspension. The doses seen in the Table were administered in two portions, in the morning and in the afternoon, respectively. On the 8th day the animals were killed and the pellets were dissected. After removal of fat and extraneous tissue, the pellet were dried for 5 hours at 50°C and weighed. The weight of the cotton pellet before implantation was subtracted from the weight of the dried, dissected pellet and drug efficiency was calculated from the obtained difference. Significance was calculated with Student's t test and drug effect was expressed as per cent. The results are shown in Table 2.

Table 2

| Dose mg./kg. | Effect granulom tissue control | treated | Inhibition % |
|---|---|---|---|
| 5.5 | 70.4±19.9 | 56.7±11.1 | 19.5 |
| 11 | 70.4±19.9 | 52.0±17.8 | 24.8 |

II. Analgesic Effect

Male mice weighing 15–18 g. and starved for 16 hours were used for the experiments. The drug was given orally, the control mice obtained a drug-free suspension. After 2, resp. 4 hours the animals were injected 1% acetic acid solution (0.1 ml. per mouse) intraperitoneally. Upon the effect of the injection the animals reacted in a few minutes with writhing. The mice were observed for 20 minutes and the number of writhes was counted. Comparison of the number of writhes in the control and the treated animals served as a basis of evaluation of drug effect. Significance was calculated by Student's t test, and efficiency of the drug was expressed as per cent. Each experiment was performed on a group of 12–16 animals. The results are shown in Table 3.

Table 3

| | Analgesic effect | | | | | |
|---|---|---|---|---|---|---|
| Dose mg./kg. | Control | $2^h$ treated | Effect % | Control | $4^h$ treated | Effect % |
| 5 | 39.4±7.4 | 28.0±9.5 | 29.0 | 39.4±7.9 | 32.1±12.4 | 18.6 |
| | 51.8±11.6 | 41.1±12.2 | 20.7 | 51.8±11.6 | 41.4±12.6 | 20.1 |
| 17 | 31.6±5.1 | 10.6±6.4 | 60.8 | 31.6±5.1 | 13.7±10.7 | 56.7 |
| | 42.0±5.1 | 21.6±11.7 | 51.4 | 42.0±5.1 | 20.6±12.3 | 51.0 |

Toxicity studies

The experiments were performed on unstarved male mice of 25.30 g. body-weight.

The compound was administered in the form of 1% suspension stabilized with methylcellulose. 10 mice were treated orally administering the drug at a volume of 0.2 ml./10 g. in doses displayed in Table 4. The animals obtained the drug once daily over a period of 7 days, i.e. 168 hours. The number of deaths was registered each day. $LD_{50}$ values were calculated according to Litchfield and Wilcoxon. Detailed results are presented in Table 4.

Table 4

| | Toxicity on mice by oral administration | | | | | | |
|---|---|---|---|---|---|---|---|
| Dose mg/kg | Number of deaths/number of treated animals Hours following treatment | | | | | | |
| | 24 | 48 | 72 | 96 | 120 | 144 | 168 |
| 1000 | 0/10 | 0/10 | 0/10 | 0/10 | 0/10 | 0/10 | 0/10 |
| 1500 | 0/10 | 0/10 | 0/10 | 0/10 | 0/10 | 0/10 | 0/10 |
| 2000 | 0/10 | 0/10 | 2/10 | 2/10 | 4/10 | 6/10 | 6/10 |
| 2500 | 0/10 | 1/10 | 1/10 | 3/10 | 4/10 | 6/10 | 7/10 |
| 3000 | 0/10 | 1/10 | 3/10 | 4/10 | 5/10 | 7/10 | 7/10 |

$DL_{50}$: 2150 (1820–2537) mg./kg. p.o. calculated on the basis of deaths occurred during 168 hours.

Testing of ulcerogenic effect in rats

Unstarved rats weighing 160–180 g. were used for the experiment. The animals were divided into groups of 20. The compounds were administered as 1 % suspensions stabilized with methylcellulose, by the oral route, at a volume of 0.2 ml./100 g. Treatment was continued for 5 days (1 treatment/day), and was suspended on the 6th and 7th day. On the 8 experimental day the mice were killed by ether overdosage. After laparatomy the stomachs were removed, washed twice in water and thereafter dipped in formaline. An incision was made along the large curvature, then again rinced with water and spread on a PVC plate. The gastric mucosa is evaluated macroscopically by two methods:

1. The ulcer index was calculated. The animals were divided into groups on the ground of the diameter of the largest ulcer and the extent of the changes was scored as follows:

| Diameter mm | 0 | erosion | below 1 | 1 | above 1 |
|---|---|---|---|---|---|
| Number of scores | 0 | 1 | 2 | 3 | 5 |

The number of animals in the individual groups was multiplied by the number of scores and the products of multiplications are added and the sum thus obtained is divided by the number of animals.

2. Ulcer counts were calculated. The number of ulcers was counted on each stomach and the total number of ulcers was divided by the number of animals. The small and large intestinates were also examined macroscopically, starting from the pylorus. Changes found in the intestinates were evaluated as "all or naught" and expressed in per cent of the number of animals. Results of the above examinations are presented in Table 5.

Table 5

| Examination of ulcus formation after oral treatment in rats ||||||
| Dose mg./kg. | Deaths | Number of surviving animals | Ulcer index | Ulcer number | Percent of animals exhibiting changes of intest. mucosa |
| --- | --- | --- | --- | --- | --- |
| 27.3 | 1/20 | 19 | 0.58 | 0 | 10.5 |
| 54.7 | 5/20 | 15 | 1.5 | 0.27 | 80 |

What we claim is:

1. A method of treating gastric ulcers comprising orally administering to a patient trichloroethyl-1-(p-chlorobenzoyl)-2-methyl-5-methoxy-3-indolyl-acetate in a daily dosage of substantially 90 to 150 mg. and sufficient to ameliorate the condition.

* * * * *